(No Model.)
L. HUMBARGER.
APPARATUS FOR TRANSPLANTING PLANTS.
No. 525,344. Patented Sept. 4, 1894.
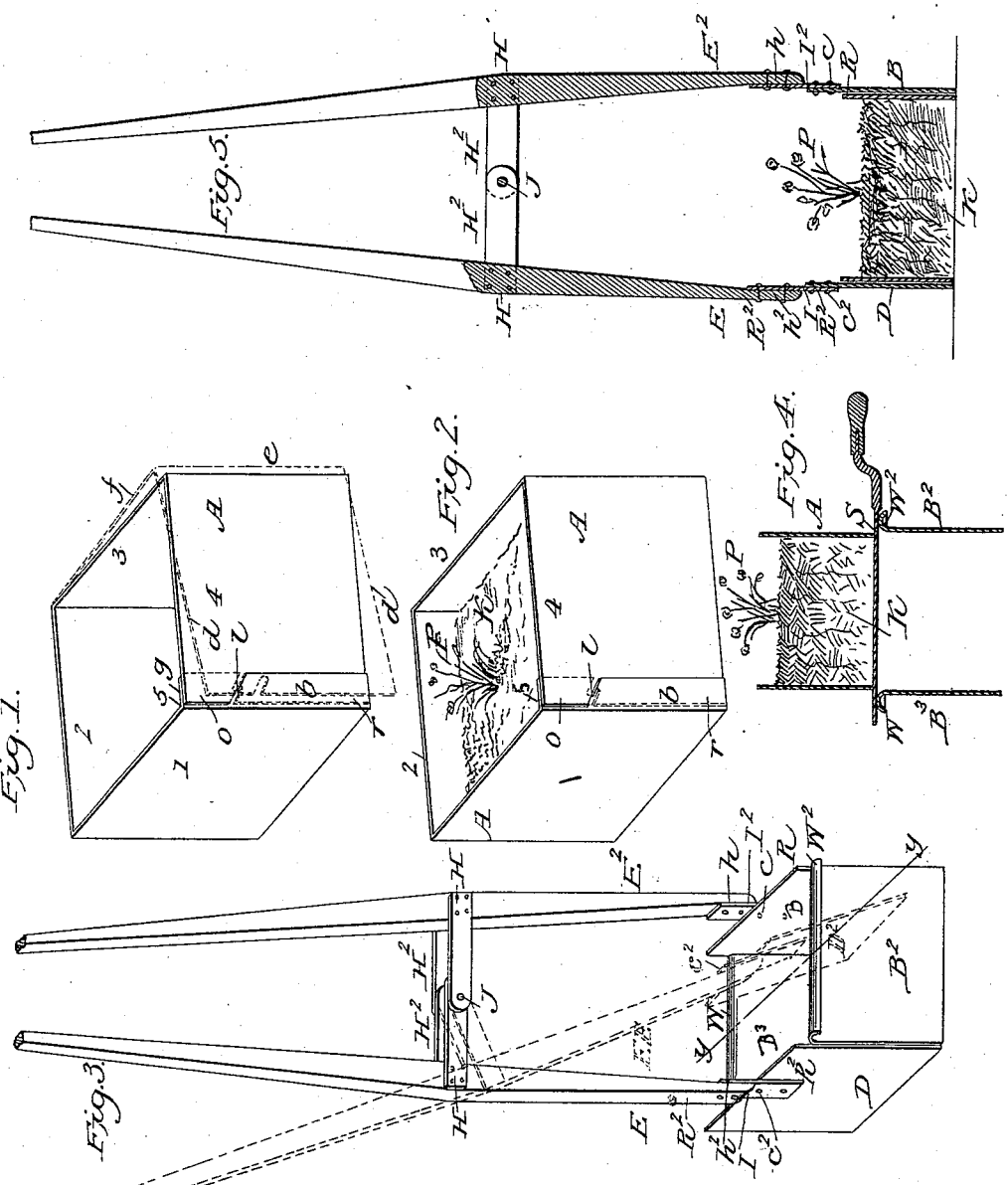

UNITED STATES PATENT OFFICE.

LAUREN HUMBARGER, OF NEAR COLUMBIA CITY, INDIANA.

APPARATUS FOR TRANSPLANTING PLANTS.

SPECIFICATION forming part of Letters Patent No. 525,344, dated September 4, 1894.

Application filed June 26, 1893. Serial No. 478,931. (No model.)

*To all whom it may concern:*

Be it known that I, LAUREN HUMBARGER, a citizen of the United States, residing near Columbia City, in the county of Whitley and State of Indiana, have invented certain new and useful Improvements in Apparatus for Transplanting Plants; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to effect certain new and useful improvements in apparatus for transplanting plants from the receptacles in which they are originally planted and partly grown to the ground or soil where they are to be raised for use, and I attain that object by substantially the means herein described and illustrated in the accompanying drawings, in which similar letters or figures of reference indicate corresponding parts throughout the several views.

Figure 1 represents my improved transplanting box A, usually made of tinned or galvanized iron, wood, or other suitable material, four-square, without top or bottom, and adjustably separable at or near one of its corners, as shown at 5. Fig. 2 shows one of my adjustably separable transplanting boxes nearly or quite filled with a suitable soil or plant-growing compound, K, in which a growing plant, P, is also represented. Fig. 3 is a perspective view of my improved plant-bed former. Fig. 4 is a central sectional view on line $y$, of Fig. 3. with also the lifting blade S, resting on flanges W and $W^2$ and supporting box A, and contents added thereto and shown ready to drop into the plant-bed on the sudden removal of blade S, from under said box and contents,—and Fig. 5 is a vertical central sectional view of the plant-bed former illustrated in perspective in and by Fig. 3, showing the relative positions of the various parts after the box A and contents have been dropped into the plant-bed by the withdrawal of blade S.

In the drawings A shows the transplanting box, square, bottomless and open-topped, having four equal sides, 1, 2, 3, 4, with a flange or turn $g$, formed near one corner, as at 5. The side 4 is adapted for connection with said flange by means of the diagonal slots $l$,—one being cut in the metal of the edge of side 4, and the other and corresponding one cut in the metal of said flange, thus forming a lock by which side 4 and the flange are united by means of the outside lip $o$, on said side 4, and the outside flap $r$, on the flange overlapping and being overlapped by a similar corresponding inside lip and flap, partly formed of said side and flange respectively, as shown. K represents earth or soil nearly or quite filling box A, with a young plant P, growing in the soil.

In Fig. 3, E and $E^2$ represent the two lever handles of the plant-bed former provided with two pairs of fulcrum cleats or jaws H, H, and $H^2, H^2$, pivoted together at J, and forming a common fulcrum joint for the two lever handles, to the lower ends of which at $h$ and $h^2$ are bolted the shanks I and $I^2$, which are riveted at $c$ and $c^2$ to the plain metal plates or blades B and D, as shown. These two blades form two sides of the plant-bed former when that implement (Fig. 3), is open ready for receiving the box A, containing the soil K, and plant P, growing therein,—the other two sides of the plant-bed former consisting of the plates or wings $B^2$ and $B^3$, which are usually made solidly with, and are parts of, the plate B, riveted to shank I, at $c$, although they may be attached to B by riveting or otherwise. Plates or wings $B^2$ and $B^3$ are each provided with a flange W and $W^2$, bent at right angles or slightly curved downward as shown. Blades D and B and wings $B^2$ and $B^3$ are each made sufficiently strong, sharp and smooth to enter the soil freely, while the lever handles and shanks are firmly and strongly made and well secured, though not necessarily required to be heavy or bunglesome.

The practical operation of the different parts or elements of my invention are substantially as follows: Assuming that transplanting box A, is joined together at corner 5, as illustrated in Fig. 1; that said box is thus joined and nearly or quite filled with soil and has a plant P, growing therein as shown in Fig. 2; that the plant-bed former is open and in the condition shown in Fig. 3, and that it is desired to transplant the young plant P, from the box A, in which it has thus far grown, to the garden or field in which it is to be raised for use or consumption, I proceed thus: I first separate the upper ends of the handles as indicated in Fig. 3, until the handle E is brought to position E. E. as shown by the broken lines, carrying with it blade D to D², with lower edge of blade D, closed against blade B at or near its lower edge as shown. With the two blades thus closed and their lower edges in close contact I press the implement (including the two closed blades B and D, and the two wings B² and B³ of blade B), perpendicularly into the soil to which the plant is to be transplanted, and continue said pressure until the blades and wings are all inserted in the soil so deep that farther entrance is prevented by flanges W and W² coming in contact with the surface of the earth into which the blades and wings are pressed. Then I proceed to quickly form the plant-bed by closing the handles to their present positions and at the same time forcing blade D to press the soil out from between the wings B² and B³, and forming a square hole or plant-bed between the four blades and wings D, B, B² and B³. The square plant-bed thus formed is large enough to admit box A and contents between the four blades and wings of the plant-bed former. To make the transfer of said plant P, to the plant-bed thus formed I insert under the bottom of box A, and the soil and plant therein a thin blade similar to an ordinary trowel blade, and on said blade lift said box and contents and carry them thereon to the plant-bed which is still held open by the four blades and wings as shown. I then lay the trowel blade across from flange W² to flange W, and rest it on top of said flanges, as in Fig. 4, with the box A, soil K, and plant P, between the blades B and D, and upheld by the trowel blade directly over the plant-bed formed between the said blades and wings. Then I instantly slip the trowel blade off from the tops of the flanges and from under said box and contents and let them fall squarely down into the plant-bed. Then I withdraw the plant-bed former leaving box A and contents resting in the plant-bed and on the bottom thereof. Next, and finally, I depress side 4 of box A, (Fig. 1,) to about broken lines d, d, and, thus disengaging the interlocking lips and flaps, next open sides 3 and 4 as shown by broken lines d, m, e, f, and thus separating and gently raising the sides of the box from around the soil contained therein, I finally remove the box body from the plant-bed and leave said soil standing in the form of a cube of soil in the plant-bed with the young plant growing from the top thereof.

Upward extensions R and R² of blades B and D, and flanges W and W², serve to prevent loose soil from falling into the plant-bed. The flanges also prevent pressing the blades and wings too deeply into the soil.

What I claim as my invention, and desire to secure by Letters Patent of the United States, is—

1. In apparatus for transplanting plants, the combination of the wings, B² and B³, the trowel-shaped blade supported by the flanges of said wings and the transplanting box upheld by said trowel shaped blade, substantially as set forth.

2. In apparatus for transplanting plants, the combination of the lever handles E and E²,—the pairs of fulcrum cleats or jaws, H and H²,—shanks I and I², bolted to the lower ends of said handles,—blade D, riveted to shank I,—the blades or wings B² and B³ attached at right angles to, or formed integrally with as extensions of, blade B,—flanges W² and W of said wings B² and B³ respectively, and upward extensions R and R², of blades B and D, substantially as and for the purposes set forth and illustrated.

3. In apparatus for transplanting plants, the combination of transplanting box A, with the transplanting implement consisting of handles, E, fulcrum cleats H², shanks I and I², blades B and D, auxiliary blades or wings B² and B³, flanges W and W², and upward extensions R and R² of blades B and D, substantially as set forth.

4. In apparatus for transplanting plants, the wings or auxiliary blades B² and B³ formed with, and extending at right angles from, blade B, in combination with the flanges W and W², formed on the upper edges of said wings, substantially as set forth.

LAUREN HUMBARGER.

Witnesses:
CURTIS W. JONES,
O. H. WOODWORTH.